United States Patent [19]
Green

[11] 3,829,104
[45] Aug. 13, 1974

[54] ANNULAR SEAL
[76] Inventor: Martin Green, 204 Marshall Lake Rd., Solihull, England
[22] Filed: Mar. 20, 1972
[21] Appl. No.: 236,314

[52] U.S. Cl.................... 277/29, 277/59, 277/205
[51] Int. Cl........................... F16j 9/00, F16j 15/00
[58] Field of Search......... 277/29, 58, 205, 59, 206; 92/86

[56] References Cited
UNITED STATES PATENTS

| | | | |
|---|---|---|---|
| 2,815,970 | 12/1957 | Wallace | 277/205 X |
| 2,979,350 | 4/1961 | Lansky | 277/29 X |
| 3,003,799 | 10/1961 | Marchionda et al. | 277/205 X |
| 3,179,427 | 4/1965 | Rizzo | 277/206 X |
| 3,271,038 | 9/1966 | Bastow | 277/205 |

FOREIGN PATENTS OR APPLICATIONS
944,921   12/1963   Great Britain...................... 277/205

Primary Examiner—Samuel B. Rothberg
Attorney, Agent, or Firm—Scrivener Parker Scrivener & Clarke

[57] ABSTRACT

The present invention relates to a seal, for sealing an annular space between a fixed member and a movable member in the master cylinder assembly of a vehicle braking system, comprising an annular body of resilient material defining one substantially plane end face, two substantially axially extending surfaces intended to form sealing surfaces, and an annular wall protruding axially from the other end face, and beyond the two said surfaces.

3 Claims, 6 Drawing Figures

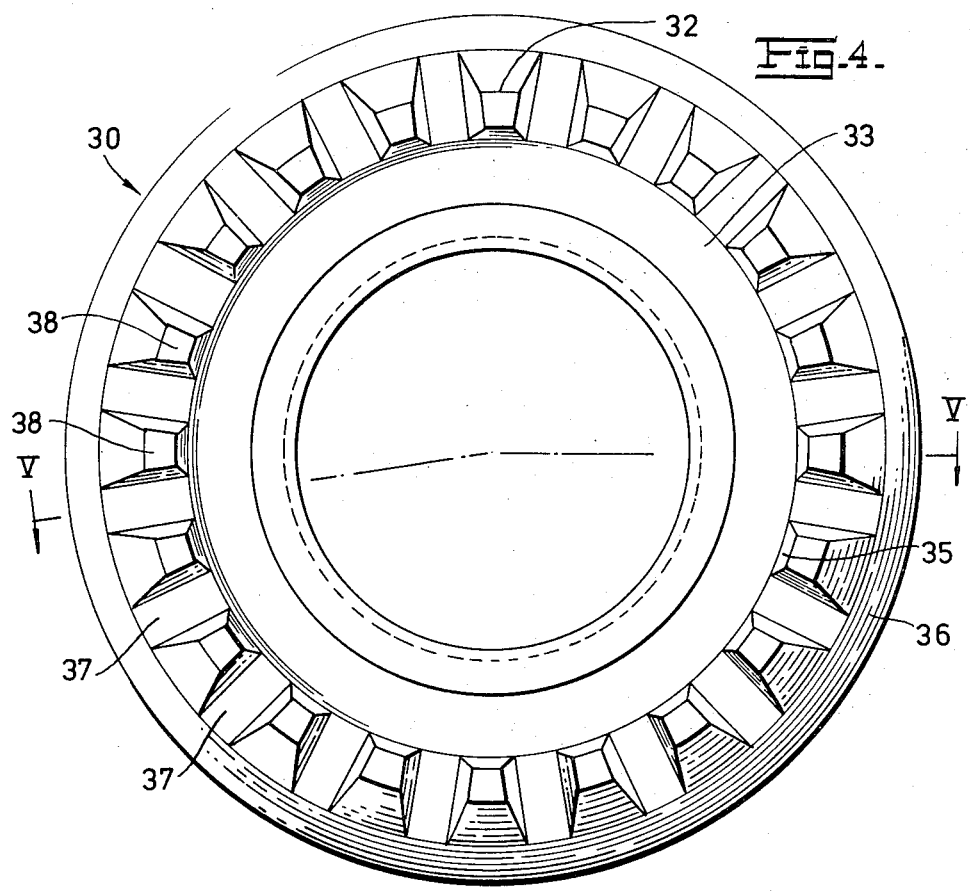
Fig. 4.
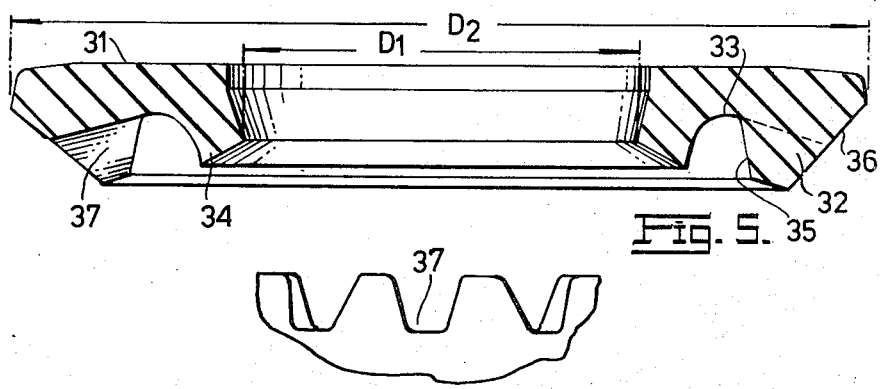
Fig. 5.
Fig. 6.

ANNULAR SEAL

The present invention relates to a seal for sealing an annular space between a fixed member and a movable member and has particular application to a seal for the master cylinder of a vehicle braking system.

Seals for sealing an annular space between a fixed member and a movable member, for example the space between a cylinder and piston rod of a piston in the cylinder, are well known and such seals generally include at least one annular sealing member of resilient material having an outer diameter slightly larger than the diameter of the cylinder bore and an inner diameter slightly smaller than the diameter of the piston so that, when inserted into the annular space, the outer diameter is compressed to form a seal with the cylinder bore and the seal member bore is stretched to form a seal on the piston rod. Such a sealing member is maintained in fixed relationship with either the moveable member or the fixed member by axial retaining means which causes compression of the sealing member and such compression causes distortion of the resilient sealing member. With known sealing members the distortion can cause interference with the sealing force exerted between the sealing member and the member moving relative to the sealing member and such interference, in disrupting the uniform sealing pressure for which the sealing member is designed, can permit leakage, when the sealing pressure is reduced by the interference, or excessive wear of the sealing member when the sealing pressure is increased by the interference.

An object of the present invention is to provide a a seal for sealing an annular space between a moving member and a fixed member.

According to the present invention a seal, for sealing an annular space between a fixed member and a moveable member, comprises an annular body of resilient material having one substantially plane end face, two substantially axially extending surfaces intended to form sealing surfaces, and an annular wall protruding axially from the other end face, and beyond the two said surfaces.

Preferably the annular wall lies within the diameters defining the annular body and conveniently the annular wall presents one limiting face remote from the sliding seal diameter of the annular body and said limiting face blends into the non-sliding diameter of the annular body.

Preferably the sliding seal diameter of the annular body is defined by a lip or bead inclined to the plane of the annular body.

In one embodiment of a seal in accordance with the invention the annular wall is continuous and presents an annular end face substantially parallel to the plane end face of the annular body. The cross sectional area of the annular wall at its axial extremity remote from the annular body is smaller than the cross sectional area of the wall at the junction of said wall with the annular body and preferably the cross sectional area of the annular wall at its extremity remote from the annular body is less than half the cross sectional area of the said wall at its juncture with the annular body.

In another embodiment of a seal in accordance with the invention the annular wall is interrupted to present a plurality of separated surfaces at its axial extremity and the radial width of the interrupted annular wall at any one of the separated surfaces is less than the radial width of the annular wall at the juncture of said wall with the annular body. The interruptions of the annular wall comprise circumferentially spaced radial grooves which extend into the annular wall substantially to the juncture of said annular wall with the annular body, and the circumferential width of each groove separating two of said separated surfaces is greater adjacent said surfaces than at the root of the groove.

The seal proposed by the present invention has particular advantage in sealing the annular space between the cylinder and the piston rod in the master cylinder of a vehicle braking system.

According to this aspect of the present invention there is provided a seal in combination with a master cylinder assembly for a vehicle braking system, the seal comprising an annular body of resilient material having one substantially plane end face two substantially axially extending surfaces intended to form sealing surfaces, and on annular wall protruding axially from the other end face, and beyond the two said surfaces, and the master cylinder assembly including an annular space between a cylindrical bore and an axially displaceable rod concentrically arranged with respect to said bore, said seal being disposed in the annular space to provide a sliding seal for the rod.

Preferably the seal, in its unstressed condition, has an outer diameter slightly greater than the diameter of the cylindrical bore and an inner diameter slightly smaller than the diameter of the displaceable rod.

Conveniently the seal is axially retained in the cylinder bore between two substantially rigid sealing rings and when two seals are provided in the cylinder bore the said seals are axially spaced apart by a substantially rigid sealing ring.

When two seals are provided one of said seals is preferably a seal with an interrupted annular wall and the other seal has a continuous wall. A vent, for venting fluid leaking past one seal into the space between the seals, is provided through the wall of the cylinder.

The rigid sealing ring may be of metal or a rigid plastics material.

The invention will now be described further, by way of example with reference to the accompanying drawings, in which:

FIG. 4 shows a front view of an alternative sealing member, FIG. 5 shows a section through the sealing members on the line III—III of FIG. 4, and FIG. 6 shows a detail edge view of part of the sealing member shown in FIGS. 4 and 5.

Figure 1:
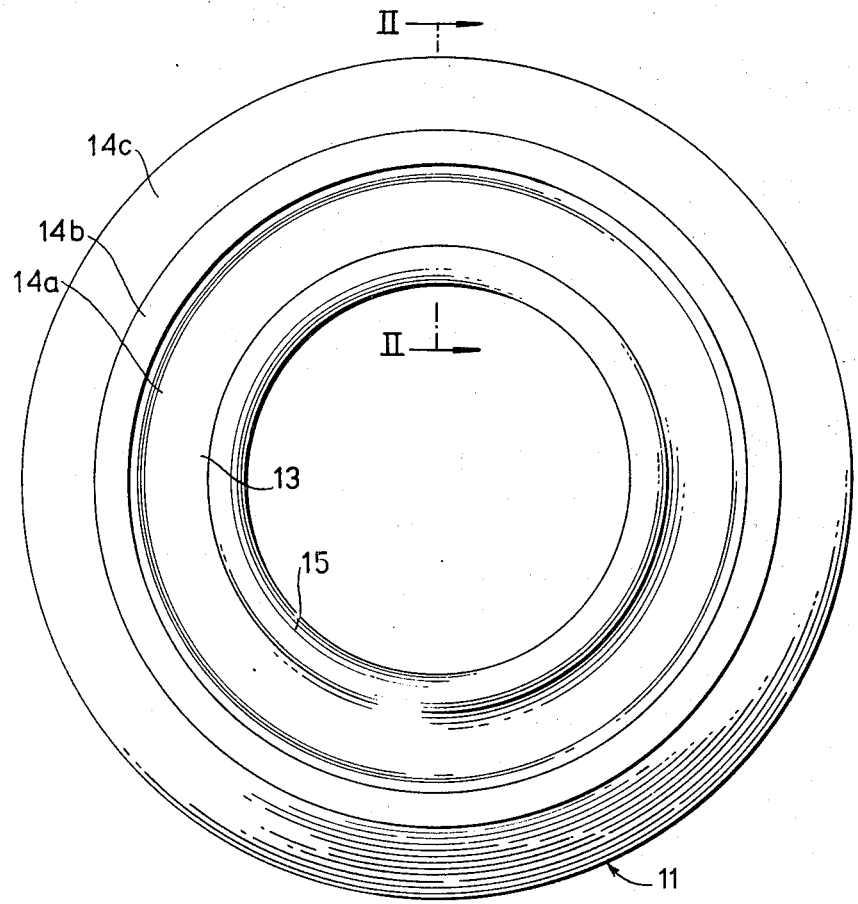
FIG. 1 shows a front view of a sealing member in accordance with the invention.
Figure 2:
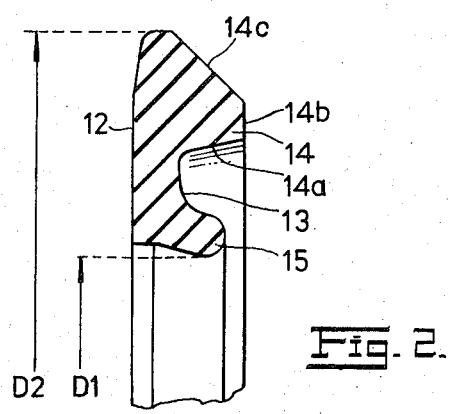
FIG. 2 shows a section through the sealing member on the line II—II of FIG. 1.

The sealing member shown in FIGS. 1 and 2 of the drawings comprises an annular body 11, of natural rubber, having an internal diameter D1 and an external diameter D2.

One end face 12 of body 11 is substantially flat with its outer peripheral regions curving into the diameter D2 and the other end face 13 having an annular protuberance 14 thereon.

The illustrated seal is intended to provide a sliding seal for a cylindrical body passing through the bore of body 11, defined by diameter D1 and thus the protuberance 14 is located in the outer regions of the body 11.

The protuberance 14 includes an inner face 14a, near the mean diameter of body 11, which extends outwardly from end face 13 at an angle of some 5° to the axis of the seal, a flat annular face 14b and an outer face 14c which extends rearwardly and outwardly from face 14b to blend into the outer diameter D2. Face 14c makes an angle of some 45° to the axis of the annular body 11.

The inner diameter D1 is defined by a lip or bead 15 which is inclined to the plane of body 11 so as to project from the plane of face 13.

Figure 3:
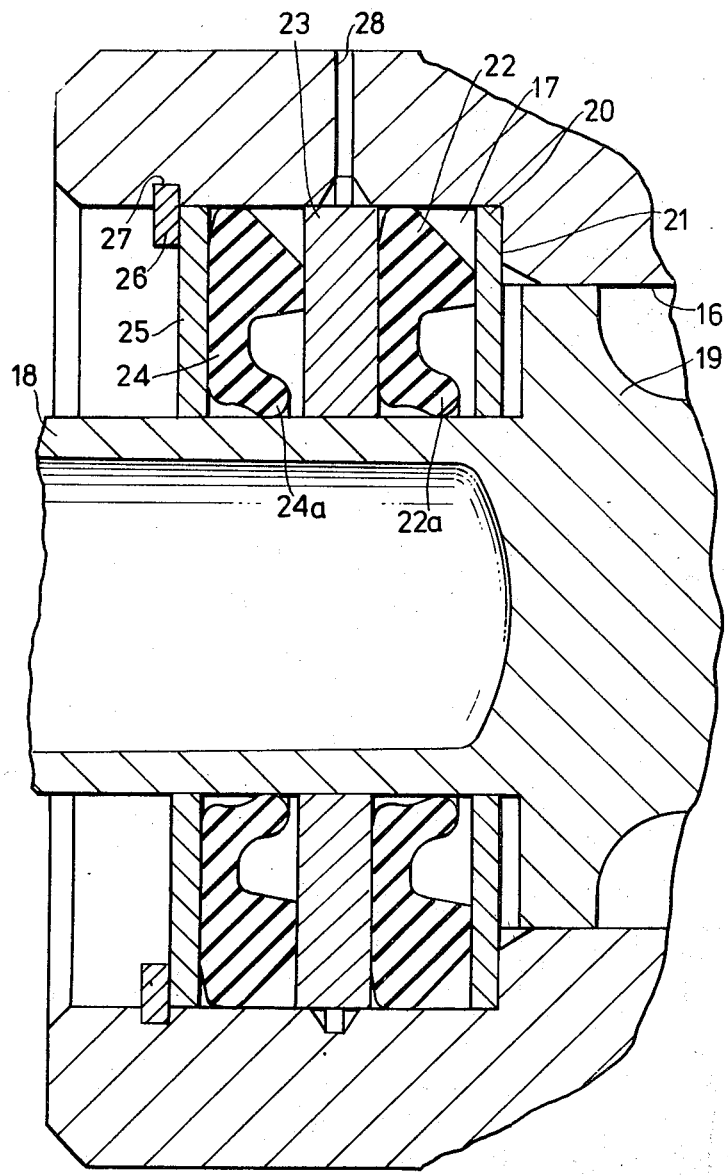
FIG. 3 shows a vertical section through a seal arrangement for the master cylinder of a vehicle braking system.

FIG. 3 shows a seal arrangement for the master cylinder of a vehicle braking system and wherein the master cylinder bore 16 includes an enlarged diameter portion 17 accommodating the seal arrangement and the piston rod 18 of the piston 19 sliding in cylinder bore 16 is the moving member with which the seal arrangement makes a sliding seal.

The seal arrangement comprises in order, a sealing ring 20, abutting the shoulder 21 defined at the junction of bores 16 and 17, a sealing member 22, a spacing ring 23, a sealing member 24, and a sealing ring 25, the assembly being retained against shoulder 21 with the sealing members 22 and 24 axially compressed between their adjacent sealing rings by a circlip 26 engaged in a recess 27 in enlarged bore 17.

The rings 20, 23 and 25 are metal rings having external diameters slightly smaller than the diameter of bore region 17 and internal diameters slightly greater than the diameter of piston rod 18 to allow piston rod 18 to slide easily therethrough.

The two sealing members 22 and 24 identical to the annular body 11 shown in FIGS. 1 and 2 of the drawings, the outer diameter D2 of each member 22 and 24 is slightly larger than the bore 17, so that said members 22 and 24 are radially compressed within bore 17, and the inner diameter D1 of members 22 and 24 is slightly less than the diameter of the piston rod 18 so as to form a sliding seal therewith. The lips 22a and 24a of the sealing members 22 and 24 define those parts of the members 22 and 24 contacting the piston rod 18.

To obtain the best seal against the direction of flow the sealing members 22 and 24 are located with their protuberances and lips 22a and 24a directed towards the cylinder bore 16.

When sealing members 22 and 24 are located between sealing rings 20, 23 and 25 and the seal arrangement is locked by circlip 26 the sealing members 22 and 24 are axially compressed, the axial compression force being applied through the annular flat faces of the protuberances of the members 22 and 24 and the compression force is absorbed between the plane face and the protuberances of each member 22 and 24 so that little distortion is transmitted to the inner regions of the seal members 22 and 24. Further, as the seal on the piston rod 18 is provided by the lips 22 and 24a and said lips are inclined to the plane of the annular seal body, any distortion of the inner regions of the seal members 22 and 24 merely causes the inclination of the lips 22 and 24 to be increased relative to the plane of the seal so that little, if any, increase of pressure between the sealing members 22 and 24 and piston rod 18 is effected.

When two sealing members 22 and 24 are provided in a sealing arrangement to prevent flow of fluid into a chamber behind the seal it is advantageous to provide a drain hole 28 between the two sealing members whereby, any liquid seeping past the first seal is allowed to drain away to prevent a build up of pressure across the second sealing member 24.

The seal arrangement shown in FIG. 3 has particular advantage in vehicle braking systems wherein the brake master cylinder is attached directly to the booster housing of a vacuum servo unit and whereby one side of the seal arrangement is exposed to hydraulic fluid (right hand side in FIG. 3) and the other side of the seal is exposed to the vacuum of the servo unit. In this arrangement sealing member 22 seals the annular space against loss of hydraulic fluid from the brake cylinder into the space between the sealing members 22 and 24, which space is open to atmosphere through drain hole 28, and sealing member 24 seals the annular space against flow of atmosphere from the space between sealing members 22 and 24 and the vacuum chamber of the servo unit.

The sealing member shown in FIGS. 4, 5 and 6 comprises an annular body 30 having one plane end face 31 and an annular wall 32 protruding axially from the other end face 33. The annular body 30 includes an axially protruding lip 34 defining the internal diameter D1 for the annular body 30.

The annular wall 32 has its inner limiting face 35 radially spaced from the protruding lip 34 and the outer limiting face 36 of the wall 32 slopes towards and terminates at, the maximum diameter D2 of the annular body 30.

The annular wall 32 is interrupted by circumferentially spaced grooves 37 which, in the illustrated example, extend axially into the wall to the end face 33. The grooves 37 are equally spaced apart so that the wall 32 presents an annular array of equally spaced flat surfaces 38 at the end face remote from the annular body 30.

A sealing member of the type shown in FIGS. 4, 5 and 6 can be substituted for either the sealing member 22 or sealing member 24 or both sealing members 22 and 24 of the sealing assembly for the master cylinder arrangement shown in FIG. 3.

Particular advantage is however obtained when a sealing member with an interrupted wall, as shown in FIGS. 4, 5 and 6, is substituted for the sealing member 24 shown in FIG. 3. With such an assembly fluid leaking past the first seal 22 and through bore of the ring 23, can flow readily through the grooves 37 in the annular wall for exhaust through the vent 28 and by providing this relatively easy flow path for the escape of fluid leaked past the first seal the leakage of fluid past the sliding seal of the second sealing member is substantially reduced if not eliminated.

The sealing member shown in FIGS. 4, 5 and 6 has twenty grooves 37 each of which extends for the full axial depth of the wall. It will be appreciated that this sealing member is shown only by way of example and sealing members having more or less than twenty grooves and/or grooves of depths other than the full axial depth of the annular wall which can afford the advantages of the illustrated example will be apparent to persons skilled in the art.

I claim:

1. A seal, for sealing an annular space between a fixed member and a movable member in the master cylinder assembly of a vehicle braking system, comprising a pair of axially spaced annular bodies of resilient material, each defining one substantially plane end face, two substantially axially extending surfaces intended to form sealing surfaces, and an annular wall protruding axially from the other end face, and beyond the two said surfaces, the annular wall of at least one of the seals being interrupted to present a plurality of separated surfaces at its axial extremity, and a rigid ring axially spacing apart said annular bodies.

2. A master cylinder assembly as claimed in claim 1 and wherein one of said seals has a continuous annular wall and the other seal has an interrupted annular wall.

3. A master cylinder assembly as claimed in claim 1 and wherein a vent is provided for venting the space between the two seals.

* * * * *

UNITED STATES PATENT OFFICE
CERTIFICATE OF CORRECTION

Patent No. 3,829,104         Dated August 13, 1974

Inventor(s) Martin Green

It is certified that error appears in the above-identified patent and that said Letters Patent are hereby corrected as shown below:

[73] Assignee: GIRLING LIMITED,
               Birmingham, England

Signed and sealed this 19th day of November 1974.

(SEAL)
Attest:

McCOY M. GIBSON JR.          C. MARSHALL DANN
Attesting Officer            Commissioner of Patents

UNITED STATES PATENT OFFICE
CERTIFICATE OF CORRECTION

Patent No. 3,829,104                     Dated  August 13, 1974

Inventor(s)     Martin Green

It is certified that error appears in the above-identified patent and that said Letters Patent are hereby corrected as shown below:

[30] Foreign Application  Priority Data

March 25, 1971     Great Britain..........7878/71

Signed and sealed this 28th day of January 1975.

(SEAL)
Attest:

McCOY M. GIBSON JR.                C. MARSHALL DANN
Attesting Officer                  Commissioner of Patents